R. L. B. STRUBLE.
AUTOMOBILE SIGNAL.
APPLICATION FILED MAY 3, 1917.

1,323,118.

Patented Nov. 25, 1919.
2 SHEETS—SHEET 1.

R. L. B. Struble,
Inventor

By Geo. P. Kimmel,
Attorney

R. L. B. STRUBLE.
AUTOMOBILE SIGNAL.
APPLICATION FILED MAY 3, 1917.
1,323,118.
Patented Nov. 25, 1919.
2 SHEETS—SHEET 2.
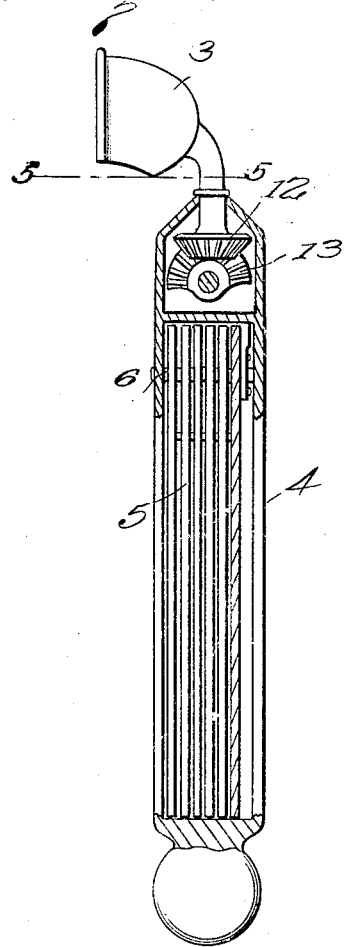
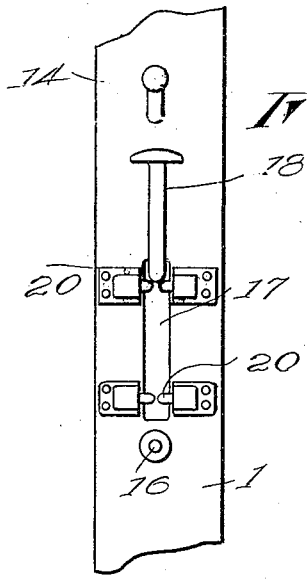
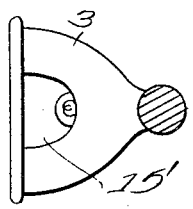
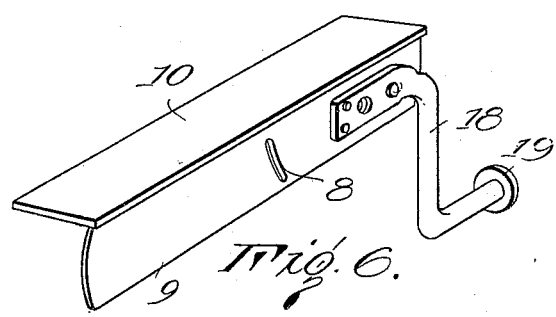
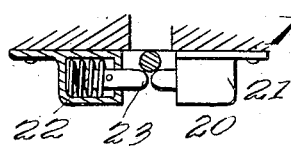
R. L. B. Struble, Inventor
By Geo. P. Kimmel, Attorney

UNITED STATES PATENT OFFICE.

ROSE L. B. STRUBLE, OF PENN YAN, NEW YORK.

AUTOMOBILE-SIGNAL.

1,323,118. Specification of Letters Patent. Patented Nov. 25, 1919.

Application filed May 3, 1917. Serial No. 166,166.

*To all whom it may concern:*

Be it known that I, ROSE L. B. STRUBLE, a citizen of the United States, and resident of Penn Yan, in the county of Yates and State of New York, have invented certain new and useful Improvements in Automobile-Signals, of which the following is a specification.

This invention relates to new and useful improvements in signals, and the primary object of the invention is to provide a signal especially applicable to automobiles, which is operable to swing outwardly at right angles to the automobile, to designate when the same is about to be turned, or otherwise maneuvered.

Another object of the invention is to provide an automobile signal of this character which has associated therewith a small light, provided with means for automatically operating the same when the signal is swung to open position.

A still further object of the invention is to provide a device of this character which is easily and simply constructed, inexpensive to manufacture, and one which will be very efficient in operation.

With these and numerous other objects in view my invention consists of the novel features of construction, combination and arrangement of parts which will be hereinreferred to and more particularly pointed out in the specification and claims.

In the accompanying drawings:
Figure 1 is a perspective view of a portion of the front of an automobile, showing the signal applied thereto;

Fig. 3 is a front view of the signal showing the top plate removed;

Fig. 4 is a rear view of the signal showing the operating means therefor;

Fig. 5 is a horizontal section on the line 5—5 of Fig. 3 looking upwardly;

Fig. 6 is a detailed perspective of the end blade of the signal that carries the cover plate therefor;

Fig. 7 is a plan view of one of the lever holding means, and

Figure 1:
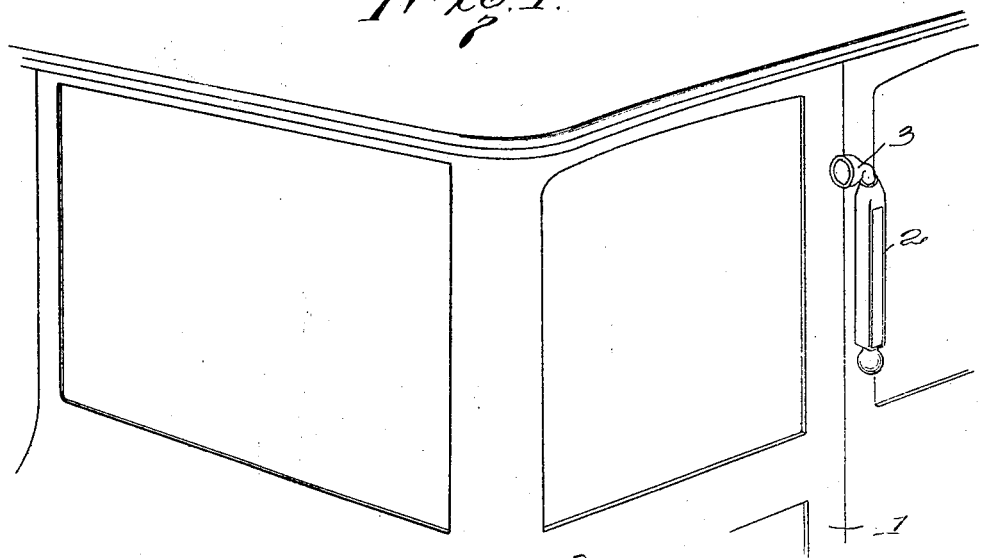

In describing my invention I shall refer to the drawings in which similar reference characters designate corresponding parts throughout the several views. The numeral 1 designates the body of an automobile, and 2 is the signal, which is provided with a small light 3 adjacent the top thereof, said signal being secured to one side of the body 1, and adapted to swing outwardly at right angles to the said body when it is desired to turn the machine, etc. This signal is shown applied to an automobile having a closed body but it is obvious that the same is applicable to various types of automobiles, and various other places other than shown in the accompanying drawings. It is only necessary that the operating means of the signal be within easy reach of the driver.

Figure 8:
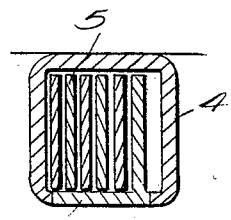
Fig. 8 is a horizontal section through the signal when the same is in closed position.

The signal comprises a substantially rectangular-shaped cylindrical casing 4 having an open outer side, and positioned in said casing are a plurality of blades 5, which form a fan-like signal, operable in a manner to be hereinafter more fully described. These blades 5 are mounted on a single axis 6 at one end of the casing, and each of the blades is provided with a projecting pin 7 which is disposed in an arcuate slot 8 in the adjacent blade, so that all of the blades will be slidably connected, so that when operated they may be swung outwardly to the fanshaped position as clearly shown in Fig. 2 of the drawings. One of the end blades which is designated by the numeral 9 has a cover plate 10 secured to the outer edge thereof, and when the blades are positioned within the casing as shown in Fig. 8 of the drawings, it is obvious that the cover plate 10 will be positioned over the open side of the casing 4.

Figure 2:
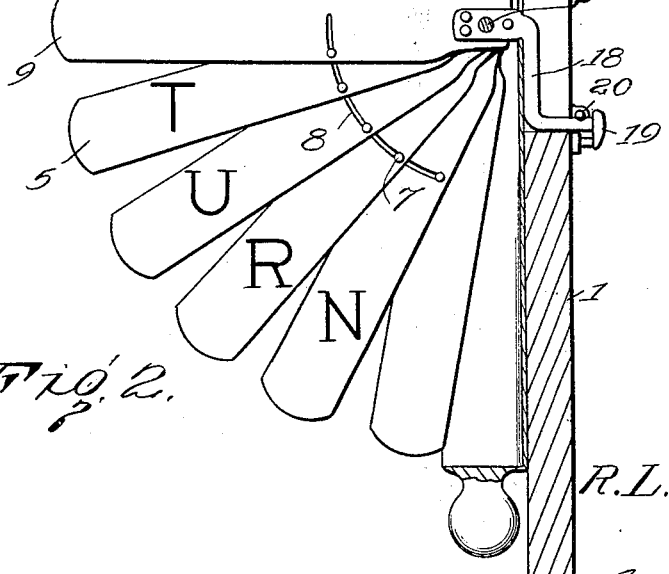
Fig. 2 is a vertical section through the same;

Positioned within the upper end of the casing 4 is the lower portion of the support of a small light 3. This portion has a beveled gear 12 thereon, and the same is adapted to mesh with a segmental ratchet 13 positioned on a lug 14 that extends through the wall of the body 1 and into the body portion of said casing. A handle 15 is formed on the inner end of said rod and within the body. It is obvious, that when these parts are arranged as shown in Fig. 2 of the drawings, upon operation of the handle 15, as the light is pivotally mounted, the same may be rotated to throw the light in various directions.

The bottom edge of the casing of the light is provided with a glass insert 15' as is clearly shown in Fig. 5 of the drawings, so that the light will be deflected on the signal to clearly illuminate the same at night. The small light comprises an electric lamp that is operable by a push button 16 positioned on the inner wall of the body 1 adjacent the casing, and being so disposed that when the signal is swung to open position, the means for operating the same will automatically operate the push button in a manner to be hereinafter more fully described. This button is also operable separately to switch the light on and off as desired.

The inner wall of the body 1 of the automobile adjacent the upper end of the casing is provided with a longitudinally extending slot 17 therein through which is adapted to project an angular lever 18 having a knob on its inner end 19 that is positioned through the inner side of said slot, while the opposite end of the lever is connected with the blade 9 of the fan-shaped signal, and is mounted on the axis 6 upon which the blades of the signal are likewise mounted. This lever owing to its peculiar shape is adapted to swing within the slot 17, so as to open or close the blades of the fan as desired. Secured to the inner wall of the body 1 adjacent the upper and lower ends of the slot 17, are pairs of locking pawls 20, which are mounted in casings 21, said pawls being spring-pressed, by means of coiled springs 22 positioned within said casings. These pawls have their outer ends rounded as shown at 23, and they are positioned from the inner wall of the body 1, so as to allow the end of the lever to be forced between the pawls, but to normally hold the same in position against the inner wall, when so placed. By this construction it is obvious that the lever 18 is locked in either open or closed position with respect to the fan-like signal.

In operation, the signal is secured to the body 1 of the automobile, as clearly shown in Fig. 1 of the drawings, the signal being normally closed within the casing 4. When it is desired to operate the same, the operating lever 18 is grasped by the knob 19, and the same swung downwardly through the slot 17, whereupon the inner end of said lever being in engagement with the end blade 9 of the fan-like signal, will lift the same, and as all of these blades are slidably connected, the same will swing outwardly to the fan-like position clearly shown in Fig. 2 of the drawings. These blades may be painted any desired color, and when so desired each one having a letter thereon to spell a certain word, for instance the word "Turn." When the lever 18 is swung downwardly to the position shown in Fig. 2 of the drawings, it is obvious that the same will be positioned through the locking pawls 20 and will be securely held thereby against casual disengagement. The spring-pressed pawls while being of sufficient strength to hold the signal in either position, allow the lever to be moved out of engagement therewith with comparative ease when so desired.

The small light 3 in the top of the casing 4 is easily adjustable, owing to the fact that the same is movable, and may be operated by moving the push button 16. When driving at night, and the small light not being in position, and it is desired to make a turn, when the lever 18 is swung downwardly to move the fan-like signal to open position, the knob 19 on the end of said lever will engage the push button 16, and force the same inwardly whereupon the small light will be lighted. As the bottom edge of the small light casing is provided with a glass insert as clearly shown in Fig. 5 of the drawings, it is obvious that rays of light will be reflected downwardly upon the open signal so as to illuminate the same to make it easily observable to automobilists following the machine upon which the signal is placed. The signal is so placed that it may be clearly seen by day or night and the driver also can see whether or not it is operating correctly.

From the foregoing description taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having fully described my invention, what I claim as new, and desire to secure by Letters Patent, is:

1. In a direction indicator, a casing a plurality of slidably connected blades pivotally supported in the casing, a support for the casing provided with a vertical slot, an operating arm carried by one of the blades extending through the slot and provided with an angular terminal, and spring actuated retaining members arranged adjacent the top and bottom of the slot and engageable with the angular terminal of the operating arm to releasably lock the latter in various adjusted positions.

2. In a direction indicator, a casing, a plurality of slidably connected blades pivotally supported in the casing, a support for the casing provided with a vertical slot, an operating arm carried by one of the blades extending through the slot and provided with an angular terminal, and pairs of spring actuating pawls arranged adjacent the top and bottom of the slot and engageable and depressible by the angular terminal of the arm to releasably lock the latter in various adjusted positions.

In testimony whereof I affix my signature hereto.

ROSE L. B. STRUBLE.